United States Patent Office 2,911,389
Patented Nov. 3, 1959

2,911,389

RESINS FORMED FROM BIS-(HYDROXYMETHYL)-PHOSPHINIC ACID AND A POLY-CARBOXYLIC ACID

John Carl Pernert, Niagara Falls, N.Y., assignor to Hooker Electrochemical Company, Niagara Falls, N.Y., a corporation of New York No Drawing. Application September 21, 1953
Serial No. 381,480

6 Claims. (Cl. 260—75)

This invention relates to the preparation of certain polymeric resins containing phosphorus, and is more particularly concerned with the reaction product of an organic di- or poly-basic acid with bis-hydroxymethane phosphinic acid. Specifically, the compositions of the present invention are acidic polymeric resins analogous to the alkyd-type resins.

The resins of the present invention may be readily formed by the reaction of the phosphinic acid with a di- or poly-basic organic acid, such as, for example, citric, phthalic, maleic, succinic, adipic, sebacic, tartaric, fumaric, glutaric, pimelic, suberic, azelaic, et cetera, that is, an organic acid containing at least two carboxyl groups. These acids are esterified with bis-hydroxymethane phosphinic acid under such conditions that the water present and that formed during the esterification is removed continuously. In some cases, the reaction may be conducted by contacting the reactants at a temperature above about fifty degrees centigrade. The temperature is preferably maintained at the reflux temperature of the reaction mixture, since this allows a shorter reaction time as compared with the time required to complete the reaction when lower temperatures are employed. If reflux temperature is employed, it will be noted that the temperature will rise gradually until the reaction nears completion.

I have also discovered that the continuous removal of water can be effected advantageously, and the esterification reaction itself be more carefully controlled, by maintaining in the reaction mixture toluene or other inert liquid which forms a binary or ternary azeotropic mixture with water and the organic material, and which is capable of removing the water as the azeotrope by distillation. The distilled toluene and the other organic material can be recycled, after separation of the water therefrom.

The preferred process of the invention consists essentially in heating under reflux a mixture of bis-hydroxymethane phosphinic acid and the appropriate organic acid, and, if desired, a substantial proportion of an inert diluent, such as toluene, which is substantially insoluble in water and forms a binary or ternary azeotropic mixture with water. The mixture is heated so that a slow continuous vapor stream of the binary or ternary azeotrope is carried outside the main reaction mixture; this vapor stream is condensed and allowed to settle in a water separator, in which the condensed water containing some dissolved organic material stratifies in a lower layer and the toluene or other inert diluent stratifies in another layer. The water layer is discarded and the toluene, or other inert diluent is dried, if desired, by passing it through a bed of solid dehydrating agent such as calcium oxide, silica gel, or the like, or by refrigeration, and is returned to the main reaction mixture. Upon removal of the theoretical quantity of water, the product may be recovered in conventional manner, as by separation of the toluene or other inert diluent.

The inert solvents which may be used to remove water continuously by distillation from the reaction mixture include benzene, toluene, xylene, carbon tetrachloride, trichloroethylene, perchloroethylene, anisole, di-n-butyl ether and higher ethers. Esters, aldehydes, and ketones, are not suitable because of their lack of inertness in the reaction mixture. In general, the preferred solvents are those which are inert in the reaction and form binary azeotropic mixtures with water. In general, the solvent should be chosen with respect to its inertness, the composition of its azeotrope mixture with water (the azeotrope containing the greatest percentage of water being preferred, if it is in other respects as good) and its solubility in water. Even a water-soluble solvent may be used if provisions other than those for the mere separation of an aqueous layer were taken to remove the water before return of the distilled solvent to the reaction mixture.

Since the reaction herein involved has a tendency toward reversibility, the use of a bis-hydroxymethane phosphinic acid containing a minimum amount of water is preferred. However, for ease in handling and ease in solution of the acid which is employed, it is desired that some water be present with the bis-hydroxymethane phosphinic acid. Equimolecular quantities of the acids are usually employed, however, variations of this ratio may be utilized to vary the physical and chemical properties of the final resin.

The resins of the present invention are at least partially soluble in water and generally insoluble in the usual organic solvents. They are either viscous liquids or hard, brittle solids, and when contacted with water exhibit strong acidic tendencies.

The following examples are given to illustrate the method of the present invention, but are not to be construed as limiting.

*Example 1*

Fifty grams of phthalic acid and 42 grams of an aqueous solution (specific gravity 1.48) of bis-hydroxymethyl phosphinic acid were mixed together and 125 grams of toluene added. The mixture was heated to boiling, and thereafter heated gently under reflux in an apparatus provided with a condenser, moisture trap, and a return line to the flask. In this flask the condensed vapors were collected, the two liquid layers that formed were separated periodically, the toluene layer being returned to the flask through the return line, and the water layer being allowed to accumulate in the trap or discarded immediately upon each separation. In this manner, any water initially present in the reaction mixture together with that formed during the reaction, was continuously removed from the zone of reaction. After eight hours of heating, approximately 13.5 milliliters of water were separated, and removal of the toluene by distillation left a pale yellow resin which did not crystallize. When heated to 100 degrees centigrade, this resin was soft, and at higher temperatures became fluid enough to be poured. At room temperature, the material was brittle, insoluble in organic solvents, but somewhat soluble in water forming a turbid acidic solution.

*Example 2*

One hundred and forty-six grams of adipic acid and 148 grams of an 85 percent aqueous solution of bis-hydroxymethyl phosphinic acid were mixed and heated on a hot plate for four and one-half hours, during which time there was a gradual loss of 49 grams, and an increase in temperature to a maximum of 197 degrees centigrade. There was thus obtained a very viscous liquid, light brown, soluble in water, and strongly acidic.

*Example 3*

Ninety-eight grams of maleic anhydride and 148 grams of 85 percent bis-hydroxymethyl phosphinic acid were mixed and heated to 200 degrees centigrade over a period of nine and one-half hours. There was a loss in weight of 32 grams and the resulting product was a clear, light tan, hard, brittle, acidic resin.

*Example 4*

Phthalic anhydride (0.675 gram mole) and 85 percent bis-hydroxymethyl phosphinic acid in water (0.675 gram mole) when heated to 170 degrees centigrade in an open beaker gave an amber, clear, hard, glassy resin which was hygroscopic and dissolved readily in water to form a strongly acidic solution.

In the manner of the foregoing examples, succinic acid, sebacic acid, tartaric acid, fumaric acid and citric acid were, in turn, mixed with appropriate proportions of bis-hydroxymethyl phosphinic acid and heated to about 175 degrees centigrade. All gave non-crystallizing resinous products, strongly acidic in nature and soluble in water.

The resins of the present invention have utility in the treatment of metallic surfaces for the forming of corrosion-inhibiting films.

Various modifications may be made in the method and products of the present invention without departing from the spirit or scope thereof, and it is to be understood that I limit myself only as defined in the appended claims.

I claim:
1. The process for preparing acidic resins which comprises: heating, at a temperature above about fifty degrees centigrade, bis-hydroxymethyl phosphinic acid and an organic acid containing at least two carboxyl groups, and removing water from the resulting mixture.
2. The process for preparing acidic resins which comprises: contacting bis-hydroxymethyl phosphinic acid and an organic acid containing at least two carboxyl groups, in the presence of a water azeotrope-forming organic solvent inert under the reaction conditions, heating the mixture so as to cause distillation of the azeotrope, separating water and solvent, and returning the solvent to the reaction mixture.
3. The process for preparing acidic resins which comprises: heating, at a temperature above about fifty degrees centigrade, bis-hydroxymethyl phosphinic acid and phthalic acid, and removing water from the resulting mixture.
4. The process for preparing acidic resins which comprises: heating, at a temperature above about fifty degrees centigrade, bis-hydroxymethyl phosphinic acid and adipic acid, and removing water from the resulting mixture.
5. The process for preparing acidic resins which comprises: heating, at a temperature above about fifty degrees centigrade, bis-hydroxymethyl phosphinic acid and maleic anhydride, and removing water from the resulting mixture.
6. The process for preparing acidic resins which comprises: heating, at a temperature above about fifty degrees centigrade, bis-hydroxymethyl phosphinic acid and phthalic anhydride, and removing water from the resulting mixture.

References Cited in the file of this patent
UNITED STATES PATENTS

| | | |
|---|---|---|
| 2,646,420 | Morgan | July 21, 1953 |
| 2,768,997 | Reeves | Oct. 30, 1956 |

OTHER REFERENCES

Hoffman: J. Amer. Chem. Soc., 52, 2995–8 (1930).